Nov. 22, 1938.  R. C. BLAYLOCK ET AL  2,137,382
WING FLAP
Filed Nov. 6, 1936  4 Sheets-Sheet 1
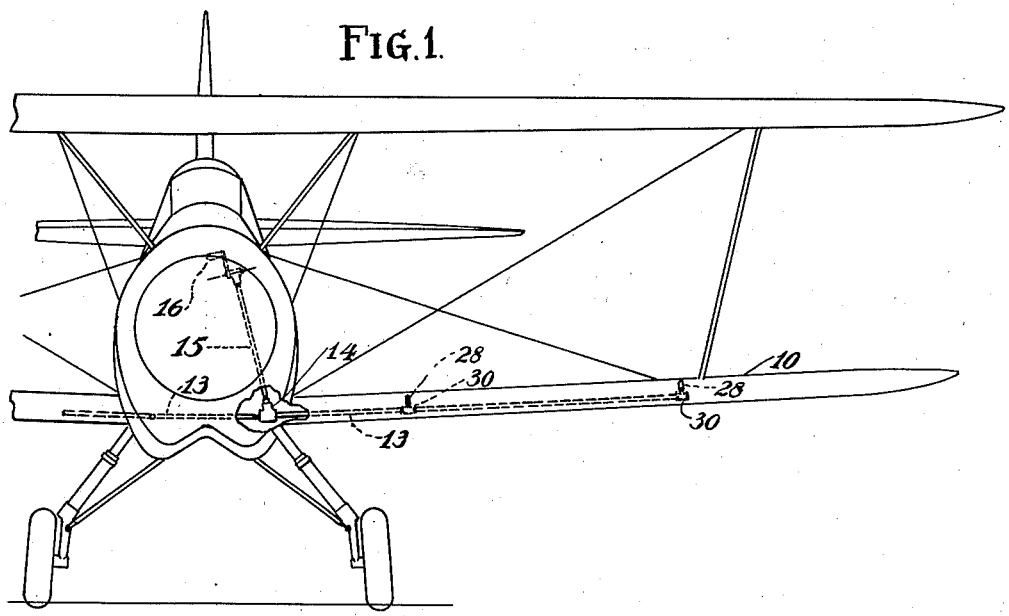
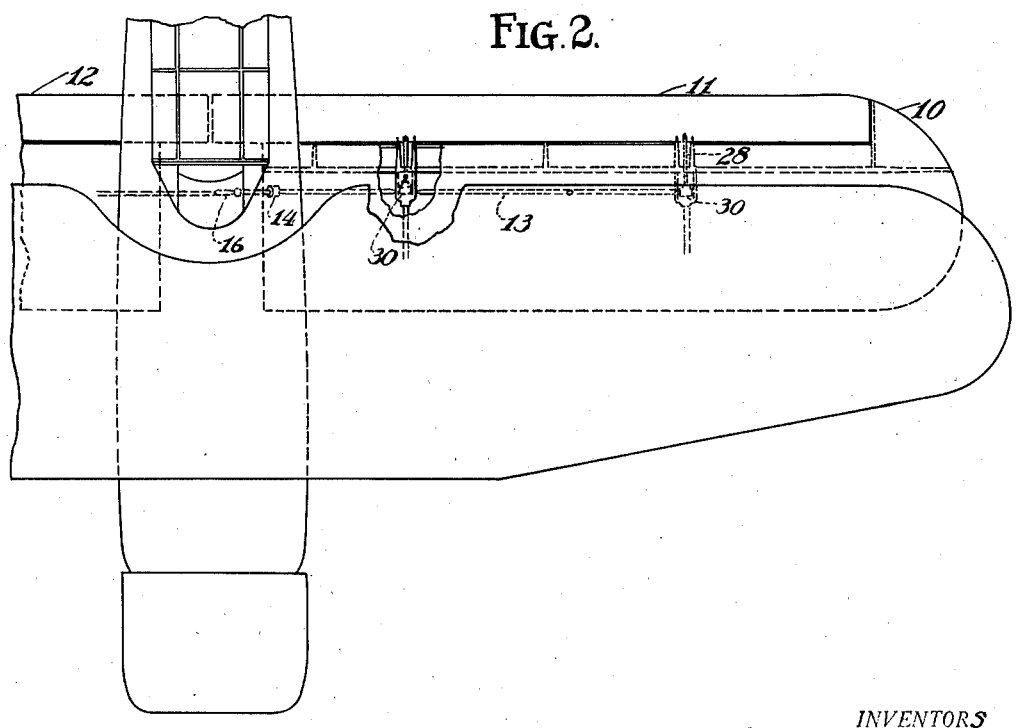
INVENTORS
RAYMOND C. BLAYLOCK.
ROBERT R. OSBORN.
FRANCIS P. BASSETT.
EDWARD R. CHILD.
BY
ATTORNEY.

Nov. 22, 1938.  R. C. BLAYLOCK ET AL  2,137,382
WING FLAP
Filed Nov. 6, 1936  4 Sheets-Sheet 2

INVENTORS
RAYMOND C. BLAYLOCK
ROBERT R. OSBORN.
FRANCIS P. BASSETT.
EDWARD R. CHILD.
BY
ATTORNEY.

Nov. 22, 1938.   R. C. BLAYLOCK ET AL   2,137,382
WING FLAP
Filed Nov. 6, 1936   4 Sheets-Sheet 3

INVENTORS
RAYMOND C. BLAYLOCK.
ROBERT R. OSBORN.
BY FRANCIS P. BASSETT.
EDWARD R. CHILD.
ATTORNEY.

INVENTORS.
RAYMOND C. BLAYLOCK.
ROBERT R. OSBORN.
FRANCIS P. BASSETT.
EDWARD R. CHILD.
BY
ATTORNEY.

Patented Nov. 22, 1938

2,137,382

UNITED STATES PATENT OFFICE 2,137,382

WING FLAP

Raymond C. Blaylock, Francis P. Bassett, and Edward R. Child, Kenmore, N. Y., and Robert R. Osborn, New Orleans, La., assignors, by mesne assignments, to Curtiss-Wright Corporation, a corporation of New York Application November 6, 1936, Serial No. 109,430

13 Claims. (Cl. 244—42)

This invention relates to aircraft control systems, and is particularly concerned with a novel means for operating split trailing edge flaps of wings.

In the aircraft art, flaps have in the past been applied to the trailing edges of wings for the purpose of changing the lift and drag characteristics of the wings. In some instances, split flaps have been utilized, these being provided with operating means to raise the upper of the split flaps above the chord line of the wing, and to lower the lower flap below the chord line of the wing for the purpose of increasing the wing drag when it may be desired to reduce the flying speed of the aircraft as in a dive or certain other maneuvers. Other types of trailing edge flaps have been arranged for movement between a position coextensive with the wing profile and a position below the chord line of the wing, to attain the dual function of increasing the wing lift as well as increasing its drag. The latter type of trailing edge flap, capable merely of being lowered below the normal wing profile, has some beneficial effect, but not as much as is desired, when used as an aerodynamic brake to slow the aircraft in a dive.

The present invention contemplates an arrangement of split trailing edge flaps which can be spread apart, one above and one below the normal wing chord, for use as an aerodynamic brake, and which also can be moved below the wing chord, together, to act as a lift increasing device for landing and take-off maneuvers. A single control apparatus is provided for both functions of the flap, the control being moved in one direction to effect splitting of the flaps, and being moved in the other direction for lowering both flaps, the intermediate position of the control means being neutral wherein both flaps are substantially coextensive with the normal chord line of the airfoil section.

Objects of the invention are: To provide a single operating means for split wing flaps, whereby said flaps can be moved in a plurality of different relationships with respect to the wing; to provide coordinated locking devices to prevent movement of the flaps relative to the wing or to each other when such movement is undesired; to provide coordinated means to prevent relative movement of the flaps when movement of the flaps together is desired with respect to the wing, and conversely to prevent joint movement of the flaps with respect to the wing when individual movement of the flaps is desired; and to provide cam means for predetermining the desired movement of split flaps in accordance with proper operation of the control elements.

Other objects will be apparent from a reading of the sub-joined specification and from an examination of the attached drawings, in which similar numbers indicate similar parts, and in which:

Fig. 1 is a front elevation of an aircraft showing, in a diagrammatic manner, the control devices for the flaps;

Fig. 2 is a plan of an aircraft showing the control devices and flaps according to the invention;

Figure 3:
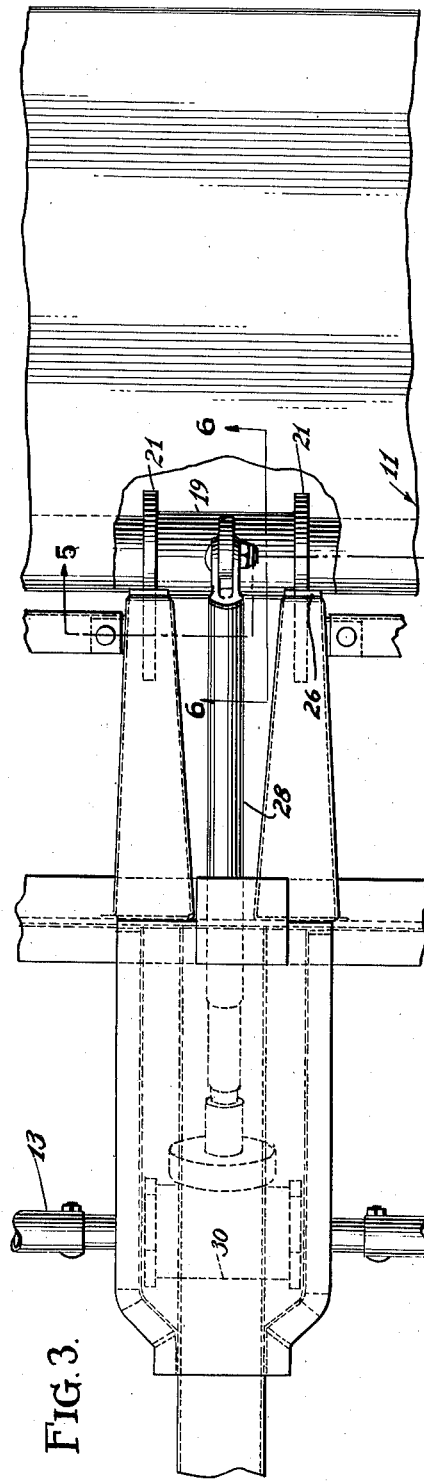
Fig. 3 is an enlarged fragmentary plan of the split flap and control organization therefor.
Figure 4:
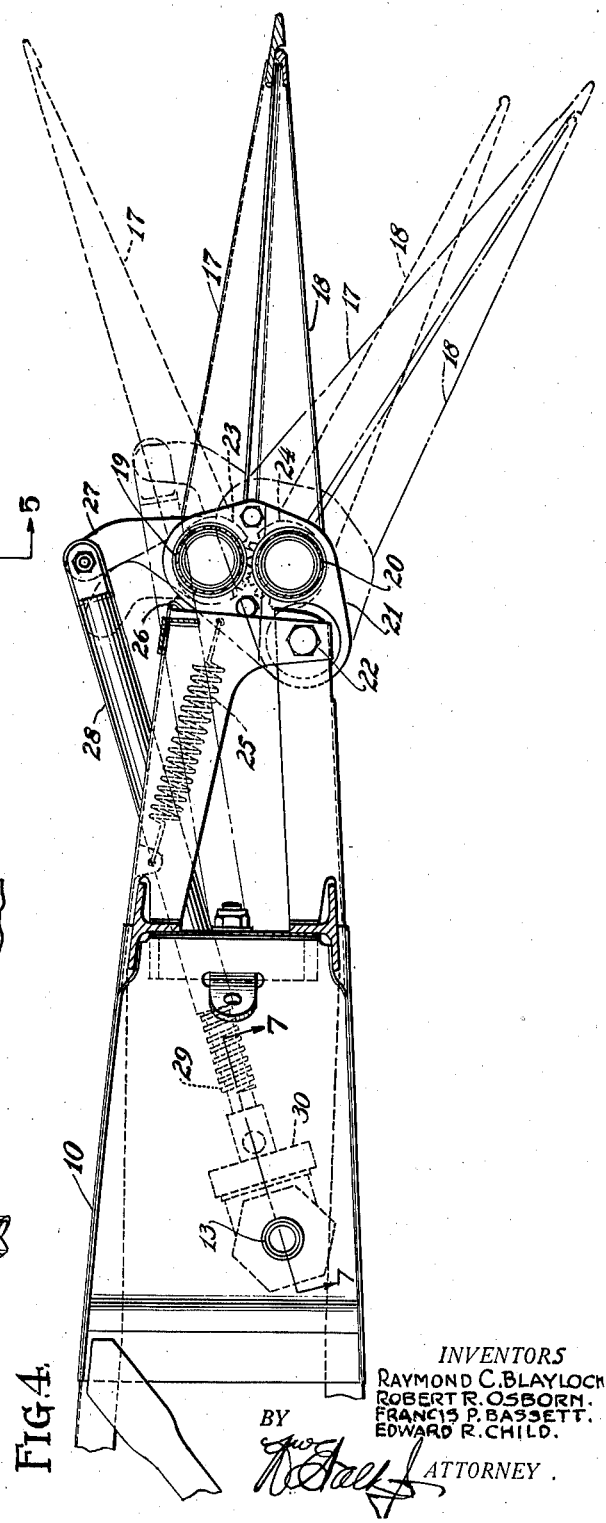
Fig. 4 is a section through the rearward part of the wing, the flaps and control mechanism.
Figure 5:
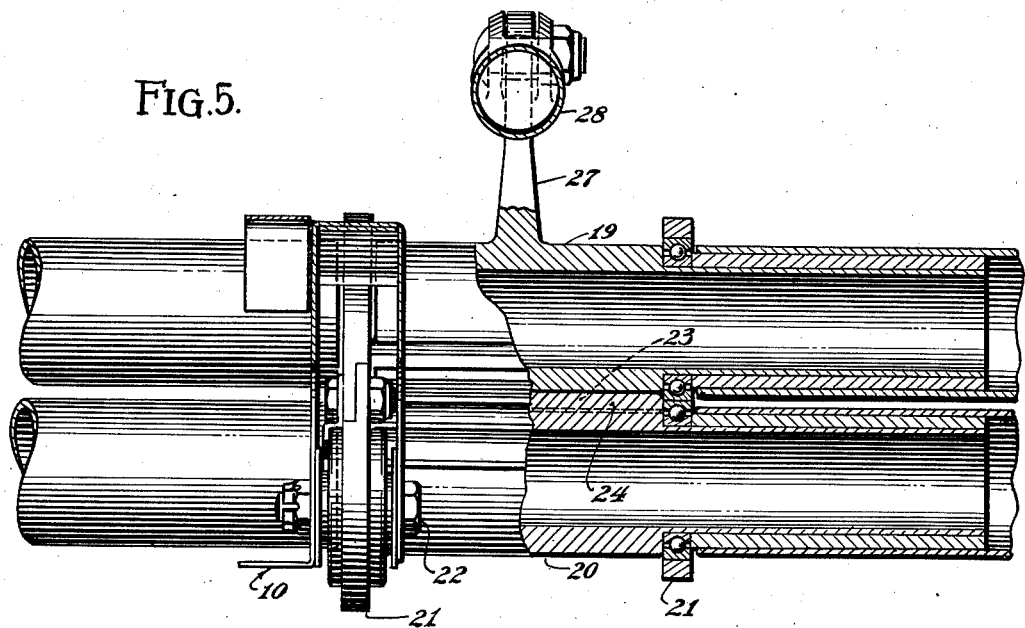
Fig. 5 is a section on the line 5—5 of Fig. 3.
Figures 6, 7:
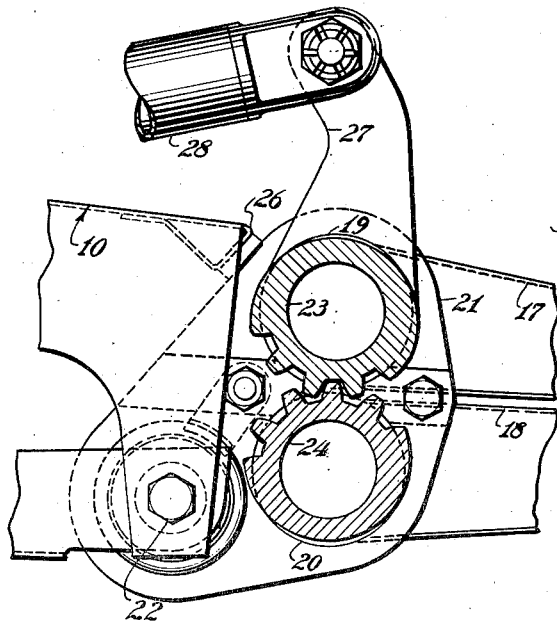
Fig. 6 is a section on the line 6—6 of Fig. 3.
Fig. 7 is a section on the line 7—7 of Fig. 4.

Referring to Figs. 1 and 2, which show a conventional single engine biplane having a retractable landing gear, the lower wing 10 is equipped with trailing edge flaps 11 and 12 which are substantially coextensive with the lower wing span. These flaps are adapted to be controlled by a rod 13 running spanwise through the wings, the inner end of said rods being connected, within the fuselage, to a gear box 14 having an upwardly extending operating rod 15 adapted to be turned by a hand crank 16. The rods 13 are capable of being turned in either direction. The flap unit 11, as shown in Fig. 4, comprises, in fact, two flaps 17 and 18 adapted for nesting with respect to one another and for normal positioning as a continuation of the profile of the wing 10, forming the trailing edge of said wing. The flaps 17 and 18 are individually hinged on tubes 19 and 20, respectively, said tubes being turnable in spanwise spaced brackets 21 which, in turn, are hinged to the structure of the wing 10 by pivots 22 spaced below and forwardly of the tubes 19 and 20. The tubes 19 and 20 are provided with gear segments 23 and 24 so that when one of the tubes is turned the other will turn equally and oppositely, whereby the flaps are split apart to the position shown in dotted lines in Fig. 4, presuming that the fitting 21 is not moved. The flaps 17 and 18 may likewise be moved bodily together, by swinging the fitting 21 about its pivot 22, whereby the flaps may be moved together to a lowered position, as in landing and take-off, as represented by the dot-dash lines in Fig. 4.

The fitting 21 is connected with the structure of the wing 10 by a spring 25 normally tending to hold said fitting in an up position so that the fitting engages a limit stop 26 on the wing.

The top tube 19 is provided with a horn 27, this horn being connected to a push-pull tube 28, this tube having threaded engagement with a turnable lead screw 29 extending from a small gear box 30. The screw 29 and the rod 13 are respectively provided with meshed bevel gears 31 and 32, whereby turning of the rod 13 effects turning of the screw 29 with consequent axial movement of the tube 28. If the rod 13 is turned in one direction, the flaps initially being in their normal full line position, as shown in Fig. 4, the horn 27 may be swung forwardly, whereby the flaps 17 and 18 are split apart. Opposite turning of the rod 13 will return the flaps to their normal position, the spring 25 in this operation preventing swinging of the fitting 21 about its pivot 22. Continued turning of the rod 13 in the latter named direction, after the flaps 17 and 18 have come into contact, will cause turning of both flaps and the fitting 21 as a unit about the pivot 22, to cause bodily lowering of the flaps as for landing or take-off. When the rod 13 is now turned in the first mentioned direction, the flaps and fitting 21 will be moved bodily to contact with the stop 26, the spring 25 assisting in this movement, whereupon the flaps will be in their normal position.

Figure 8:
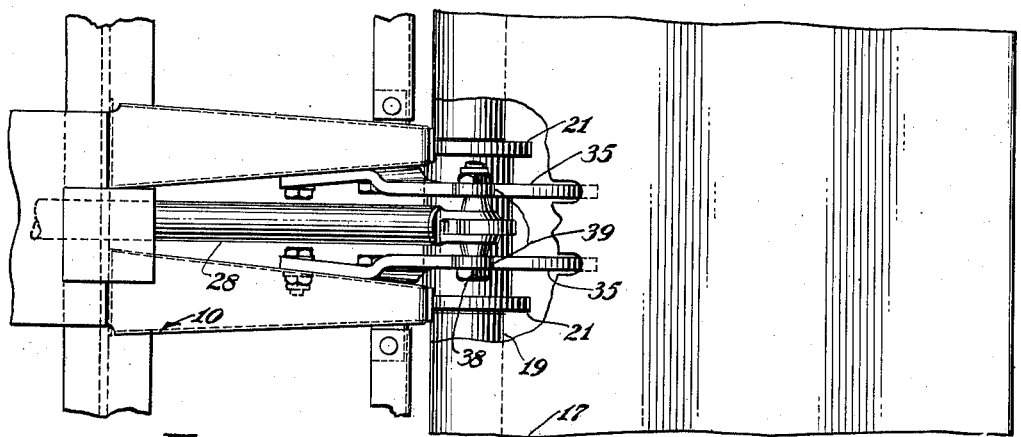
Fig. 8 is a plan of an alternative embodiment of the flap control mechanism.

It will be apparent that the above described device depends largely upon the spring 25 to cause proper relative movement of the flaps with respect to each other and with respect to the wing. In order to make this movement more determinate, without dependence upon springs, the embodiment of Figs. 8 and 9 has been evolved.

Figure 9:
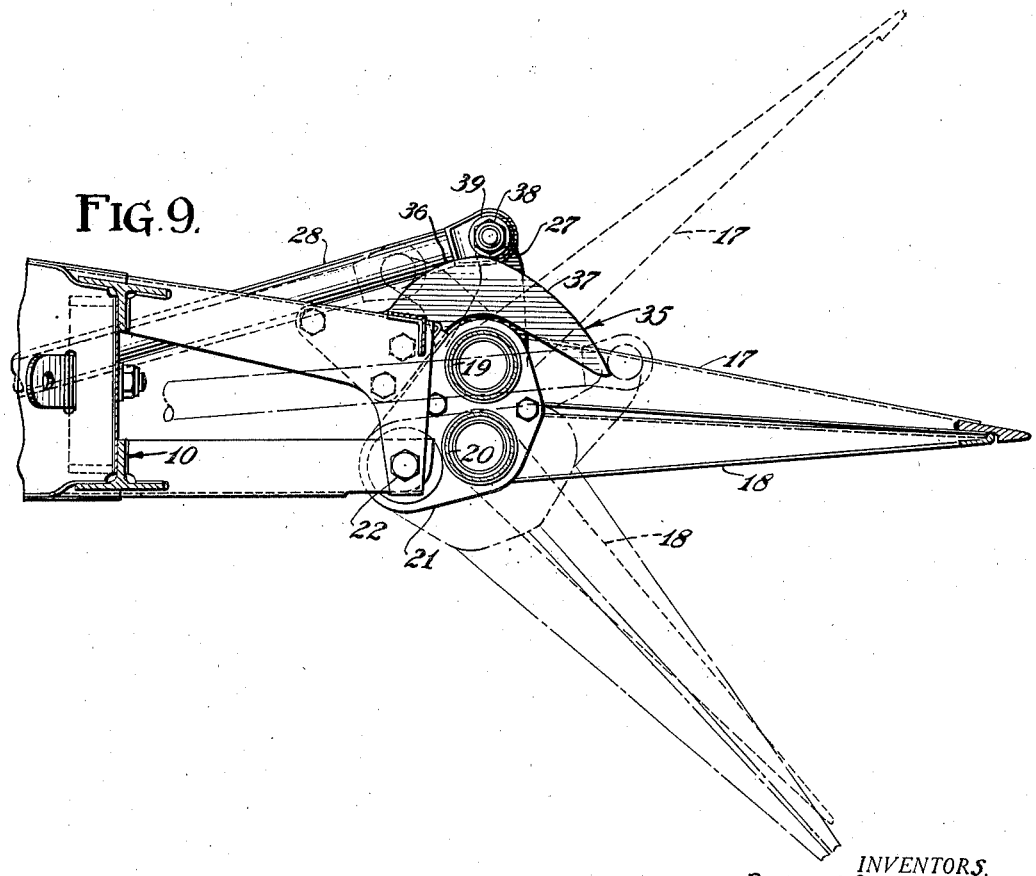
Fig. 9 is a section through a rearward part of a wing equipped with the flaps and control mechanism of said alternative embodiment.

This arrangement has essentially the same elements, including the flaps 17 and 18, the fitting 21, the pivot 22, the tubes 19 and 20, geared together, the horn 27 and the push-pull tube 28 as in the previous embodiment. In addition, cams 35 are mounted on the structure of the wing 10 adjacent the horn 27, these cams having a forward portion 36 struck on an arc concentric with the tube 19, and a rearward part 37 struck on an arc concentric with the pivot 22. The connection between the horn 27 and the push-pull rod 28 comprises a bolt 38 having rollers 39 in contact with the cam 35. Referring to Fig. 9, it will be seen that in operation, when the push-pull rod 28 is pulled from the position shown in solid lines, the flaps 17 and 18 will be split and the rollers 39 will follow around the cam portions 36. When the push-pull tube is then moved rearwardly, the bearing of the rollers 39 on the cam portion 36 will prevent movement of the fitting 21 about its pivot 22 and will thus enforce closing of the split flaps about their respective axle tubes 19 and 20, until the normal solid line position is reached. Thereafter, as the push-pull tube is moved rearwardly, the cam portion 37 permits movement of the flaps with the fitting 21 about the pivot 22, whereby the flaps are bodily movable to a downward position, the cam form preventing movement of the flaps 17 and 18 with respect to each other. When the push-pull rod 28 is again drawn forwardly, the flaps and fitting 21 will be bodily raised to the neutral position.

Obviously, the operation of the device need not be progressive as described, but any combination of flap movement is selected according to the proper operation of the push-pull tube 28.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft wing, a fitting pivoted thereto, split trailing flaps pivoted to said fitting for opposed movement relative to said fitting, and unitary means for selectively moving said flaps and fitting bodily relative to said wing and for moving said flaps relative to each other and to said fitting.

2. In an aircraft wing, a pair of relatively movable split flaps organized for operation as an aerodynamic brake and as a lift increasing means for said wing, said flaps being respectively movable above and below the wing chord for brake action, and being bodily movable, together, below the wing chord for action as a lift increasing device, a control member having a neutral position, and means responsive to control member movements on either side of said neutral position for respectively moving said flaps relative to one another and said wing for brake action, and for moving said flaps bodily, together, below the wing chord for lift increasing action.

3. In a split wing flap control system, a carrier fitting pivoted to the wing, a pair of split flaps respectively pivoted to said fitting on centers remote from said fitting pivot, a horn on one said flap, a push-pull connection connected to said horn, said horn including a cam follower, and a cam on the wing having one portion concentric with said fitting pivot and a second adjoining portion concentric with the horn-carrying flap pivot, and stop means on the wing against which said fitting abuts, said cam follower following the first cam portion during bodily movement of said flaps and fitting relative to the wing, and following the second said cam portion during opposed movement of said flaps relative to each other.

4. In a split wing flap control system including a pair of split flaps movable with respect to each other and with respect to the wing; a device for preventing movement of the flaps relative to each other while they are being moved together relative to the wing, a device for moving said flaps in opposed directions to an equal extent above and below each side of the wing chord, means for preventing joint movement of said flaps in the same direction during their opposed movement, and a single progressively operable control member for effecting, sequentially, joint and relative flap movement.

5. In an operating mechanism for a wing flap system, the system comprising upper and lower flaps movable respectively to positions above and below the wing chord, and movable jointly in adjacent relationship to a position below the wing chord, unitary means turnable in one direction to move said flaps jointly from said adjacent lowered position to a position substantially coextensive with the chord line and adjacent one another and thereafter to move said flaps apart, respectively above and below said chord line, said means being turnable in the opposite direction to reverse the above indicated movements.

6. In an aircraft wing, a trailing edge flap system comprising superposed split flaps hinged for joint movement while adjacent one another to positions below the wing chord, and for opposed movement above and below the wing chord line respectively, a driving connection from one said flap to the other for effecting said opposed movement in response to movement of one flap, and unitary means selectively operable to sequentially effect said joint and said opposed movements.

7. In an aircraft wing, a trailing edge flap system comprising superposed split flaps having a neutral position wherein both lie adjacent the wing chord line, said flaps being opposedly movable above and below said chord line as a first phase of movement, and at least one of said flaps being movable only below said chord line as a separate phase of movement, and unitary means selectively operable to effect said phases of movement.

8. In an aircraft wing, a trailing edge flap system comprising superposed flaps, the upper flap being movable upwardly from and to the wing chord line, and the lower flap being movable downwardly from and to the wing chord line, and unitary selectively operable means to jointly and simultaneously move respective flaps above and below the chord line and to move at least one of said flaps below the chord line while not moving the other flap above the chord line.

9. A wing flap operating system for trailing edge split flaps comprising a member movable between extreme positions and having an operating connection with said flaps, means effecting opposed split flap movement in response to member movement between one extreme and an intermediate point in its travel, and means effecting joint flap movement below the wing chord in response to member movement between said intermediate point and the other extreme of its travel.

10. In a wing, a pair of superposed trailing edge flaps, the lower flap being movable below the wing chord line and the upper flap being movable above and below the wing chord line, and a control member for operating both said flaps, said member being operable through one range of movement to simultaneously move said flaps in opposite directions respectively below and above the wing chord line and being operable through another range of movement to move said flaps jointly, in adjacent relationship, below the wing chord line.

11. In a wing, a pair of superposed flaps movable relative to the wing, a driving connection between said flaps operable to move said flaps relative to the wing and toward or away from one another in response to movement of one flap, and means for controllably moving one flap.

12. In a wing, a pair of superposed flaps movable relative to the wing, and single control means for said flaps including mechanism operable to move said flaps in opposite directions above and below the wing chord, respectively, and including mechanism operable to move at least one of said flaps below the wing chord only.

13. In a wing flap control mechanism for a pair of superposed flaps, a control element, a cam member and a cam follower member, one said member being associated with the wing and the other said member being associated with the element whereby the movement of said element is controlled upon movement thereof, and means responsive to the controlled movement of said element for operating said flaps in opposed relationship during part of the range of movement of said element, and for operating said flaps jointly in adjacent relationship during another part of the range of movement of said element.

RAYMOND C. BLAYLOCK.
FRANCIS P. BASSETT.
EDWARD R. CHILD.
ROBERT R. OSBORN.